United States Patent
Morse et al.

(10) Patent No.: US 7,993,534 B2
(45) Date of Patent: *Aug. 9, 2011

(54) CHEMICAL MICROREACTOR AND METHOD THEREOF

(75) Inventors: Jeffrey D. Morse, Martinez, CA (US); Alan Jankowski, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/412,599

(22) Filed: Mar. 27, 2009

(65) Prior Publication Data

US 2009/0223925 A1    Sep. 10, 2009

Related U.S. Application Data

(60) Continuation of application No. 11/196,634, filed on Aug. 2, 2005, now Pat. No. 7,534,402, which is a division of application No. 10/007,412, filed on Dec. 5, 2001, now Pat. No. 6,960,235.

(51) Int. Cl.
       *C23F 1/00*       (2006.01)

(52) U.S. Cl. ............ 216/2; 216/56; 216/57; 216/67; 422/198

(58) Field of Classification Search .............. 216/2, 56, 216/57, 67; 422/198
See application file for complete search history.

(56) References Cited

U.S. PATENT DOCUMENTS

| | | | | |
|---|---|---|---|---|
| 5,961,930 | A | * | 10/1999 | Chatterjee et al. ............ 422/130 |
| 7,534,402 | B2 | * | 5/2009 | Morse et al. ................... 422/198 |
| 2003/0031913 | A1 | * | 2/2003 | Pavio et al. ..................... 429/34 |

* cited by examiner

*Primary Examiner* — Binh X Tran
(74) *Attorney, Agent, or Firm* — Eddie E. Scott; James S. Tak

(57) ABSTRACT

A method for forming a chemical microreactor includes forming at least one capillary microchannel in a substrate having at least one inlet and at least one outlet, integrating at least one heater into the chemical microreactor, interfacing the capillary microchannel with a liquid chemical reservoir at the inlet of the capillary microchannel, and interfacing the capillary microchannel with a porous membrane near the outlet of the capillary microchannel, the porous membrane being positioned beyond the outlet of the capillary microchannel, wherein the porous membrane has at least one catalyst material imbedded therein.

13 Claims, 4 Drawing Sheets

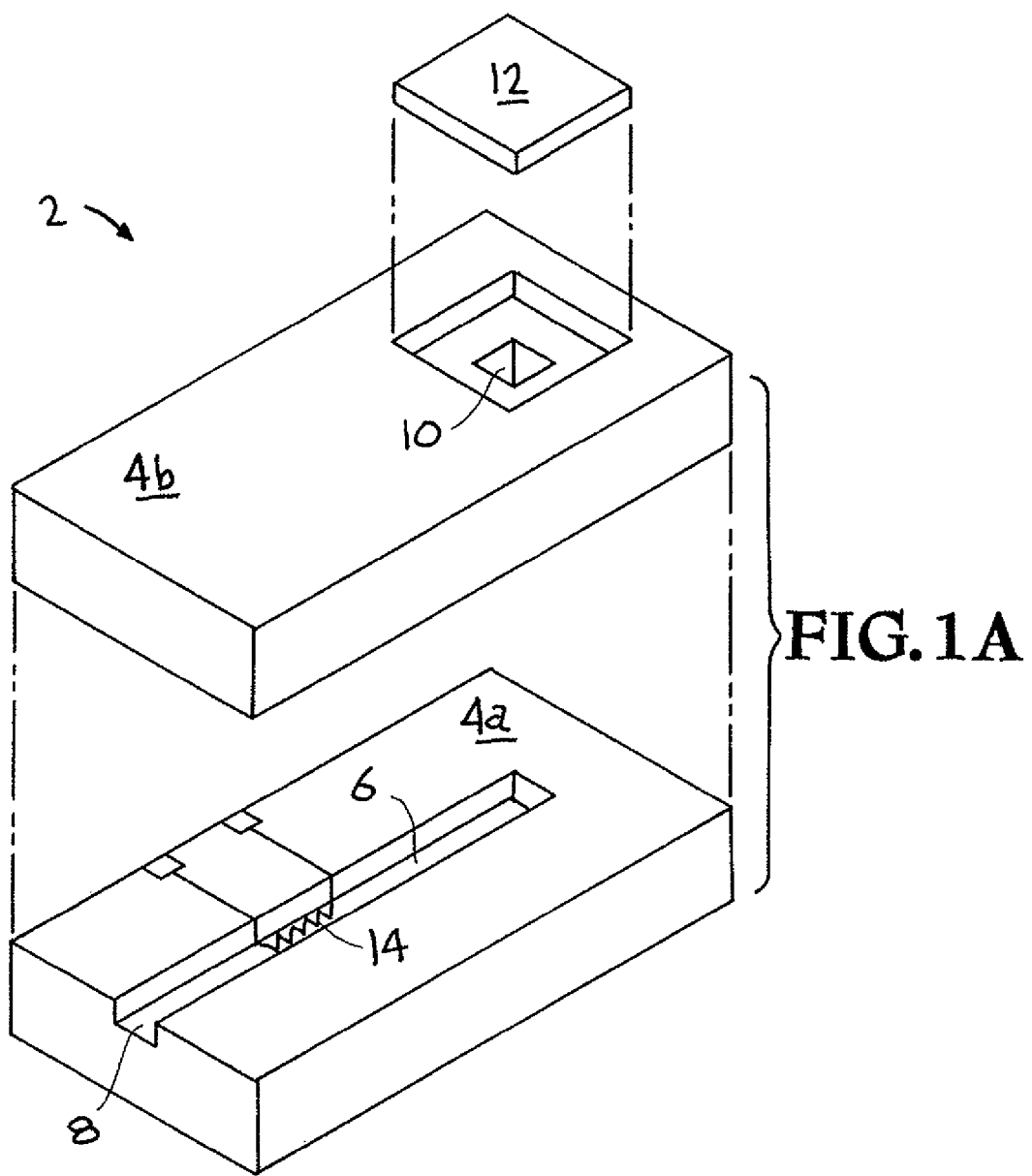
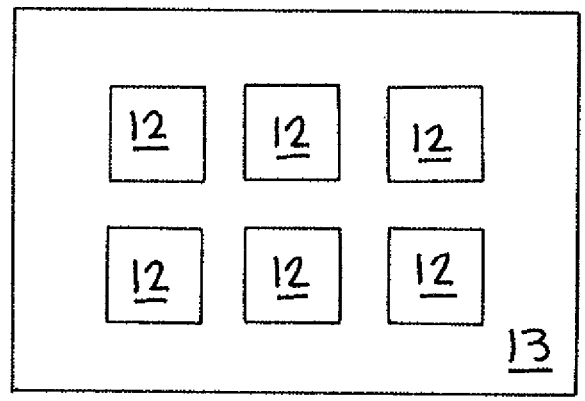
FIG. 1A
FIG. 1B

CHEMICAL MICROREACTOR AND METHOD THEREOF

RELATED APPLICATIONS

This application is a Continuation of U.S. patent application Ser. No. 11/196,634 filed Aug. 2, 2005, now U.S. Pat. No. 7,534,402, which is a Divisional of U.S. patent application Ser. No. 10/007,412 filed Dec. 5, 2001, now U.S. Pat. No. 6,960,235. This application claims priority to these prior applications and incorporates them by reference.

The United States Government has rights in this invention pursuant to Contract No. DE-AC52-07NA27344 between the United States Department of Energy and the Lawrence Livermore National Security, LLC for the operation of Lawrence Livermore National Laboratory.

BACKGROUND OF THE INVENTION

Porous membrane reactors typically utilize a bulk porous media which is affixed to the end of stainless steel tubing through which the chemical species is delivered. For the application of steam reforming hydrogen containing fuels, a catalyst is introduced to the porous membrane and the entire fixture is heated as gas is delivered to the membrane. While steam reforming of methanol has been reported at 350° C., typical operating temperatures are high, e.g., 500° C. to 700° C. due to the inability of the reactor to adequately exchange heat with the outside environment.

German patent application, DE 1998-19825102 discloses a method to produce catalytic microreactors that includes "placing a catalyst in the reaction spaces." The microreactors can be used for steam reforming or partial oxidation of hydrocarbons to produce hydrogen gas for fuel cells.

Srinivasan et al disclose in the American Institute of Chemical Engineers (AIChE) journal (1997), 43(11), 3059-3069, a silicon-based microfabrication of a chemical reactor (microreactor) having submillimeter flow channels with integrated heaters, and flow and temperature sensors. The article discusses the potential applications of this reactor and the feasibility of a variety of operating conditions.

SUMMARY OF THE INVENTION

A method for forming a chemical microreactor according to one embodiment includes forming at least one capillary microchannel in a silicon substrate having at least one inlet and at least one outlet, integrating at least one heater into the chemical microreactor, interfacing the capillary microchannel with a liquid chemical reservoir at the inlet of the capillary microchannel, and interfacing the capillary microchannel with a porous membrane at the outlet of the capillary microchannel, such that gas flow moves in a horizontal direction from the inlet through the microchannel and moves in a vertical direction from the microchannel through the outlet, wherein the porous membrane has at least one catalyst material imbedded therein.

A method for forming a chemical microreactor includes forming at least one capillary microchannel in a substrate having at least one inlet and at least one outlet, integrating at least one heater into the chemical microreactor, interfacing the capillary microchannel with a liquid chemical reservoir at the inlet of the capillary microchannel, and interfacing the capillary microchannel with a porous membrane near the outlet of the capillary microchannel, the porous membrane being positioned beyond the outlet of the capillary microchannel, wherein the porous membrane has at least one catalyst material imbedded therein.

BRIEF DESCRIPTION OF THE DRAWINGS

FIG. 1A shows an embodiment of a microreactor.

FIG. 1B shows a top view of the porous membrane structure portion of an embodiment of a microchannel.

DETAILED DESCRIPTION

Figure 2A:
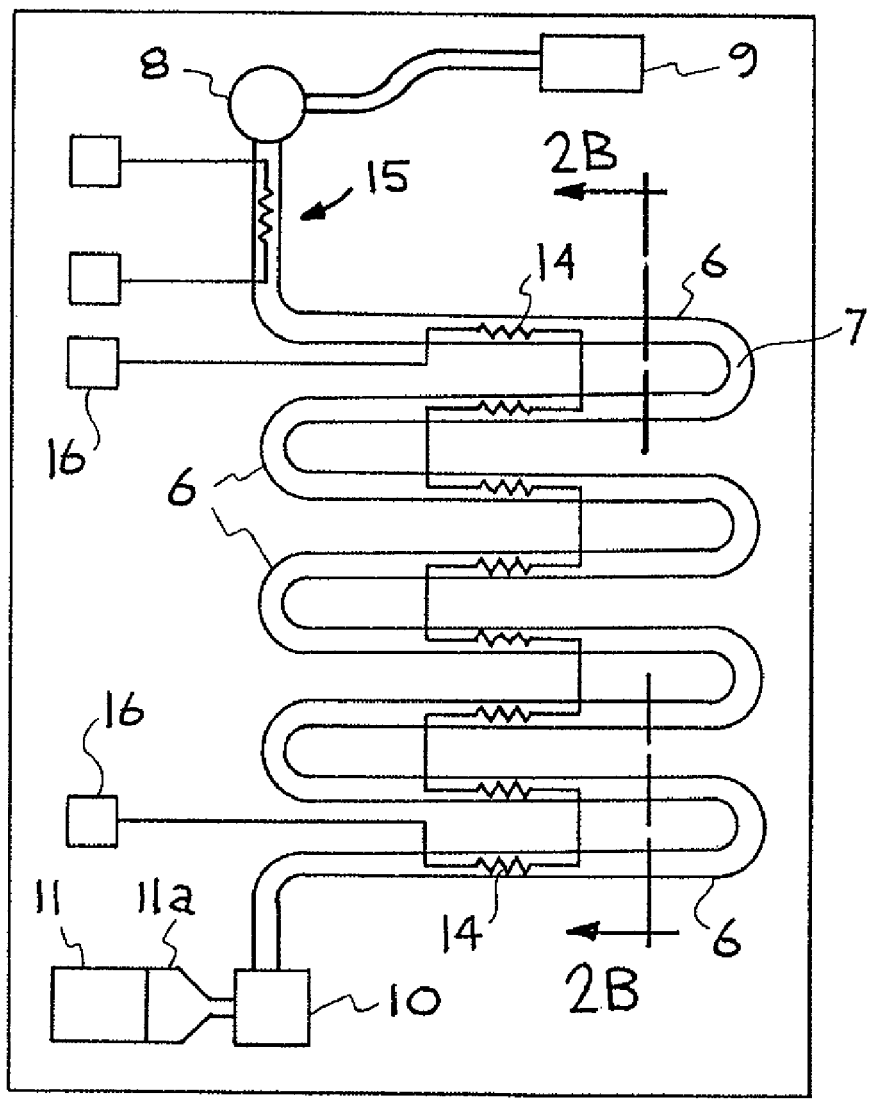
FIG. 2A shows a cross-sectional view of an embodiment of a microreactor with multiple microchannels.

Referring to FIG. 1A, a chemical microreactor 2 comprises: a bottom substrate 4a comprising silicon, glass or ceramic, a top substrate 4b comprising silicon, glass or ceramic, at least one capillary microchannel 6 having at least one inlet 8 for fuel and water and at least one outlet 10 for gases, a liquid reservoir (not shown) containing a fuel source, at least one porous membrane 12, and at least one integrated heater 14 for heating the microchannel. Referring to FIG. 1B, a porous membrane support structure 13 comprising silicon, glass or ceramic containing a plurality of porous membranes 12 is an effective alternate embodiment to porous membrane 12 of FIG. 1A. Microreactor 2 can further comprise a catalytic combustion microfluidic heat source (not shown) to heat the gases flowing through the microchannel and porous membrane(s).

Chemical microreactor 2 provides a means to generate hydrogen fuel from liquid sources such as ammonia, methanol, and butane through steam reforming processes when mixed with the appropriate amount of water. In an alternate embodiment to that shown in FIG. 1A, capillary microchannel inlet 8 mixes and delivers a fuel-water mixture from the liquid reservoir (not shown) through microchannel 6 and porous membrane 12. Porous membrane 12 can alternately be replaced with a porous membrane support structure containing a plurality of porous membranes.

Figure 2B:
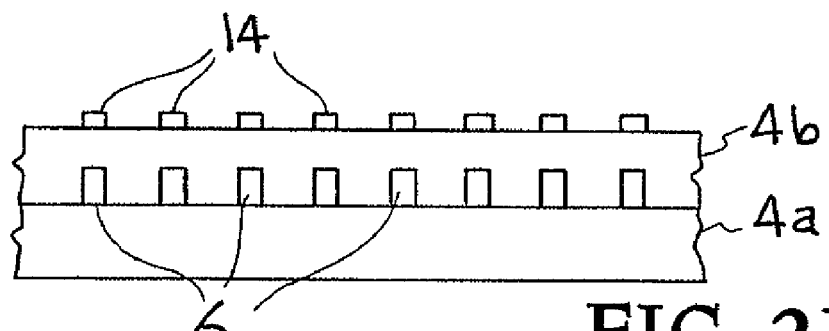
FIG. 2B shows a cross-sectional view of the microchannel and resistive heater portion of an embodiment of a microreactor.

Referring to FIG. 2A, the fuel-water mixture can first be heated by resistive heaters in a "gassifier region" 15, i.e., the region where the fuel inlet connects to the microchannel, forming a fuel-steam gas. The fuel-steam gas then flows through microchannel 6. The microchannel can be packed with a catalyst material such as, platinum, platinum-ruthenium, nickel, palladium, copper, copper oxide, ceria, zinc oxide, alumina, combinations thereof and alloys thereof. Resistive heaters 14 can be positioned along the microchannel. Heating microchannel 6 to a temperature between about 250° C. and about 650° C. by resistive heaters facilitates the occurrence of catalytic steam reforming reactions. The desired temperature depends upon the source of fuel. For example, about 250° C. is an effective temperature if methanol is used, whereas ammonia requires a temperature closer to about 650° C. Microchannel 6 is formed in a configuration that allows adequate volume and surface area for the fuel-steam gas to react as it flows through microchannel 6 and porous membrane 12. Electrical connection pads 16 provide current to resistive heaters 14. Although not shown, electrical pads 16 are connected to a power source. FIG. 2B is a cross-sectional illustration of the embodiment depicted in FIG. 2A.

Two distinct embodiment styles are effective. The first embodiment employs a packed catalyst capillary microchannel and at least one porous membrane. In this embodiment, the primary purpose of the porous membrane is to prevent large particles or molecules flowing through the microchannel to pass through the membrane. The porous membrane may or may not contain catalyst materials.

The second embodiment style employs a porous membrane with a large surface area or a porous membrane support structure containing a plurality of porous membranes having a large surface area in the aggregate, i.e., greater than about 1 $m^2/cm^3$. Surface areas on the order of about 1 $m^2/cm^3$ to about 100 $m^2/cm^3$ are effective. In this embodiment, a catalyst material is imbedded within the porous membrane(s) and the primary purpose of the porous membrane(s) is to facilitate the occurrence of catalytic steam reforming reactions. Packed catalyst capillary microchannels may or may not be used with this embodiment style. This embodiment style can reduce the size and length requirements of microchannel 6. For example, referring to FIGS. 1A and 1B, positioning porous membrane support structure 13 which contains a plurality of porous membranes 12 at outlet 10 of microchannel 6 provides a high surface area catalytic reaction. Minimizing the size of the microchannel region in this manner makes it easier to heat and maintain microchannel 6 at the high temperatures required for the steam reforming reactions to occur, i.e., about 250° C. to about 650° C. Additionally, the porous membrane support structure 13 provides a flow interface with outlet 10 and provides some restriction to gas flow resulting in a slight increase in the back-pressure of the microchannel region.

Hydrogen gas is generated by heating microchannel 6 and porous membrane 12 to an appropriate temperature, i.e., about 250° C. to about 650° C. The fuel-steam source is reformed into gaseous byproducts, i.e., hydrogen and subsequent byproducts, such as carbon monoxide and carbon dioxide, as the molecules diffuse through the membrane and flow into a fuel cell or other power source. Hydrogen is the component of the liquid fuel source that is converted into energy by a fuel cell. If chemical microreactor 2 is used in concert with a fuel cell, the gaseous molecules, after passing through the membrane structure, flow through at least one other microchannel, i.e., a gas flow channel. The gas flow channel is located at the exit side of catalytic membrane 12 and is connected to the anode manifold of a fuel cell. Additional embodiments can include the integration of a porous getter structure or permaselective membrane material at the exit side of porous membrane 12 to adsorb the product gases allowing only the hydrogen to diffuse through to the fuel cell. It is beneficial to adsorb product gases if the presence of the additional byproducts will degrade the components of the fuel cell. Any fuel cell that uses hydrogen as a fuel source can be effectively used with this invention. For example, effective fuel cells include the micro-electro mechanical system based (MEMS-based) fuel cells discussed in U.S. patent application Ser. No. 09/241,159 by Alan Jankowski and Jeffrey Morse which is hereby incorporated by reference.

A chemical microreactor can be constructed by using micromachining of silicon, glass, or ceramic materials, and wafer bonding. This method of construction involves first forming the microchannel by etching a pattern in the bottom surface of a substrate. For example, the pattern may be serpentine or straight. The depth of the microchannel is approximately 20 O Am, and penetrates only a fraction of the way through the total depth of the substrate, which can range in thickness from about 400 m to about 600 μm. Referring to FIGS. 2A (top view) and 2B (cross-sectional view), resistive heaters 14 are formed on the top surface of substrate 4b and positioned above microchannel 6 in a mariner which optimizes the heat transfer from the heaters to the microchannels. The resistive heaters can also be formed on the top surface of substrate 4a, so that they are positioned adjacent to the surface of the microchannel. Thus, the power input required to heat the fuel-water to product gases and complete the catalytic reaction as the gases flow through the channel is minimized.

Further embodiments facilitate a process referred to as counter-flow heat exchange. Such embodiments position the microchannels in configurations that permit the heat that is lost from the product gases flowing through one microchannel to be transferred to gas flow streams in adjacent microchannels. Such embodiments can include counterflow heat exchangers (not shown). The counterflow heat exchangers can be located in the following three areas and serve three different functions. First, counterflow heat exchangers can be located in the gassifier region to initially heat the fuel water mixture. A second set of counterflow heat exchangers can be located in the area between the gassifier region and the packed catalyst microchannel to add extra heat to the gas as it flows into the capillary microchannel. Finally, more counterflow heat exchangers can be located at the outlet of the porous membrane to recuperate any extra heat given off by the byproduct flow stream. The hot gas outlet of catalytic microreactors integrated with a fuel cell connect directly to the fuel cell anode manifold, and incorporate a counterflow heat exchanger at the fuel cell anode exhaust. That counterflow heat exchanger transfers extra heat from the anode exhaust from the fuel cell back through the gassifier region and inlet flow stream to the catalytic microreactor.

Figure 3:
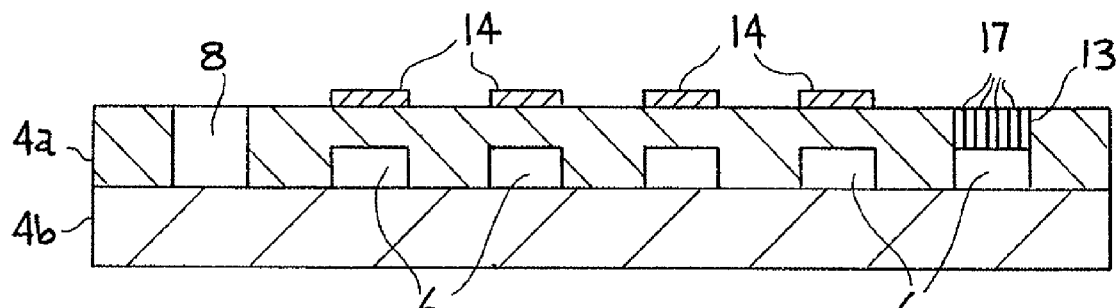
FIG. 3 shows a cross-sectional view of the microchannel and resistive heater portion of an embodiment of a microreactor with multiple microchannels.

The inlet port(s) 8 and porous membrane structure 13 are formed by patterning and etching into the top surface of the substrate 4a. Referring to FIG. 3, an inlet port 8 is approximately 1 mm in diameter and opens up to the entrance of microchannel 6. Separate inlets for fuel and water may be formed, or a single inlet for premixed fuel-water mixtures (as shown in FIG. 3) may suffice. An array of vias 17 with diameters ranging from 0.1-5.0 μm can be patterned and etched into a porous membrane support structure 13. The pores are straight, and go through to the end of microchannel 6 (for example, about 100 μm to about 200 μm deep). Silicon can be etched using conventional plasma etch (Bosch process) techniques, laser etching, or photoinduced electrochemical etching. Each etching technique will create an array of very straight, deep, narrow pores which extend to the microchannel, which is formed from the bottom side.

Another approach to forming a porous silicon membrane is to use an electrochemical etch technique whereby hydrofluoric acid is used to etch pores in the silicon. The electrochemical etch creates a random porous layer in the silicon. The pore sizes, for example, have diameters of about 0.1 μm to about 1.0 Am, and thicknesses on the order of about 60 μm to about 200 μm.

Figure 4A:
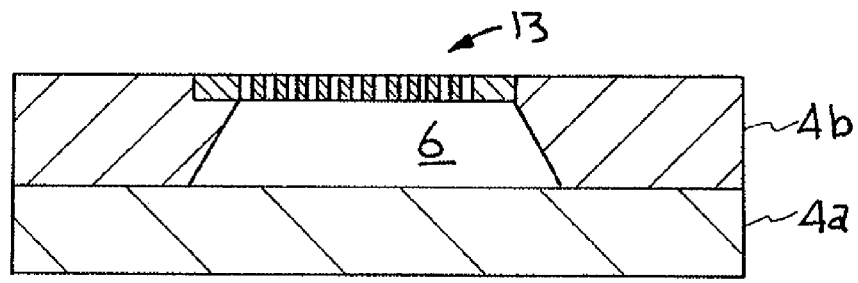
FIG. 4A shows a cross-sectional view of the microchannel and resistive heater portion of an embodiment of a microreactor.
Figure 4B:
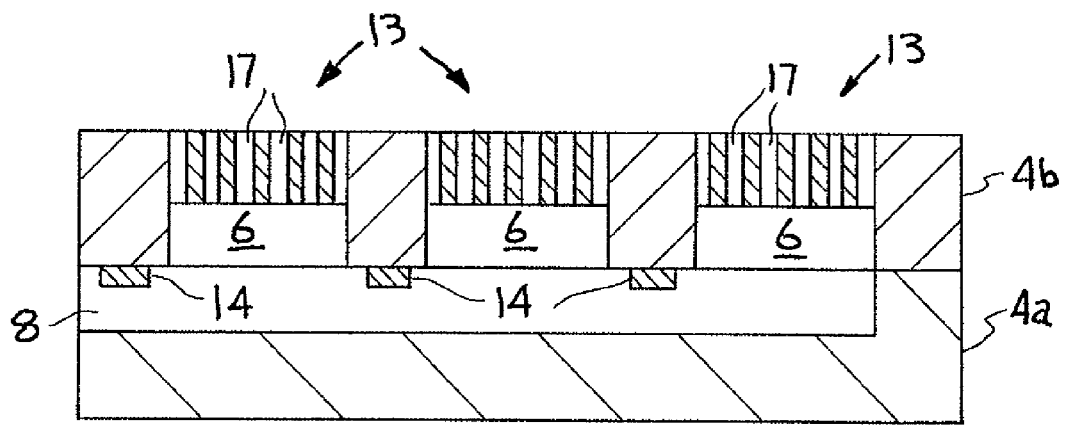
FIG. 4B shows a cross-sectional view of the microchannel and resistive heater portion of an embodiment of a microreactor with multiple microchannels.

A porous membrane support structure can be positioned at the outlet of the microchannel using a combination of thin film deposition, thick film formation, and electrochemistry techniques. Referring to FIG. 4A, the membrane structure 13 may be a porous thick film structure comprising anodic alumina, xerogel, or glass and is formed over an opening creating vias 17 which are etched down to the microchannel 6 at the outlet end. FIG. 4B shows a multiple channel embodiment. In one example, a thick film membrane comprising xerogels is formed by depositing a solgel coating of glass on the top surface of the substrate, and drying it in such a way as to create random porosity through the film. For instance, a 30 minute bake at 120° C. to remove any remaining solvents is followed by a high temperature bake at 600-800° C. Others methods known to those familiar with the art will also apply. The diameter of these pores may range in size from about 0.1 μm to about 1.0 μm, and the film can be up to about 100 um thick.

In a second example, the membrane 13 is formed by bonding a porous alumina film about 50 μm thick to the top surface of the substrate 4a over an opening leading to the microchannel 6. The porous alumina is formed by anodization of aluminum which creates arrays of narrow pores ranging in diameter from about 0.02 μm to about 0.2 gm.

The porous thick film membrane structure has two primary purposes. First, it provides mechanical strength in the case where a pressure differential exists between the inlet 8 to microchannel and the outlet 10 from the microchannel. Second, it provides a natural flow control of the gaseous reaction byproducts flowing through the porous membrane 12. The membrane structure can be controlled for the specific requirements of the power source it is feeding. For example, the fuel, when fully processed, in a 6 microliters/minute flow of a methanol:water (50:50) fuel mixture can provide approximately 500 milliwatts of electrical power from a fuel cell at 50 percent efficiency if the microchannels and microfluidic system are designed to provide minimal pressure drops the 6 microliters/minute flow rate.

Once the microchannels, porous membrane structures, resistive heaters, and counterflow heat exchangers are formed, the catalytic microreactor is completed by integrating the catalyst materials into the microchannel and porous membrane, then bonding a first substrate 4a made of glass, silicon, or ceramic to a second substrate 4b made of glass, silicon, or ceramic.

The catalyst used may be platinum, platinum-ruthenium, nickel, palladium, copper, copper oxide, ceria, zinc oxide, alumina, combinations thereof, alloys thereof or other materials commonly used in steam reforming processes. Various coating methods are used to position the catalyst materials. For example, the catalyst materials can be imbedded within the membrane and the microchannel by thin film deposition techniques or they can be imbedded within the microchannel and porous membrane structure by ion exchange or solgel doping methods. These coating methods can be tailored to provide porous, high surface area coatings, thereby enhancing the reaction kinetics.

Other effective processes use small pellets or particles of a supported catalyst material, such as Copper/Zinc Oxide/Alumina, for example, which are larger in diameter than the pore sizes of the porous membrane. This kind of catalyst material is commercially available, and is typically formed by imbedding the copper/zinc oxide materials in to a porous alumina support particle. Once formed, the catalyst particles can be colloidally suspended in a liquid solution. The colloidal solution can then be injected through the microchannel. The porous membrane traps the catalyst particles inside the microchannel. After some time, the microchannel becomes filled with catalyst particles. This process creates a packed catalyst microchannel that is porous enough for gases to readily flow through and at the same time be exposed to a high surface area of catalyst materials. This process can be used in combination with the catalyst coating methods described above, or by itself.

The membrane area and microchannel areas are made large enough to allow sufficient fuel flow for the power source requirements. In some cases, if resistive heaters require too much input electrical power to heat the microchannels and porous membrane, exothermic combustion reactions may be initiated. These exothermic combustion reactions may be self-sustaining and thus, do not require additional power.

Figure 5:
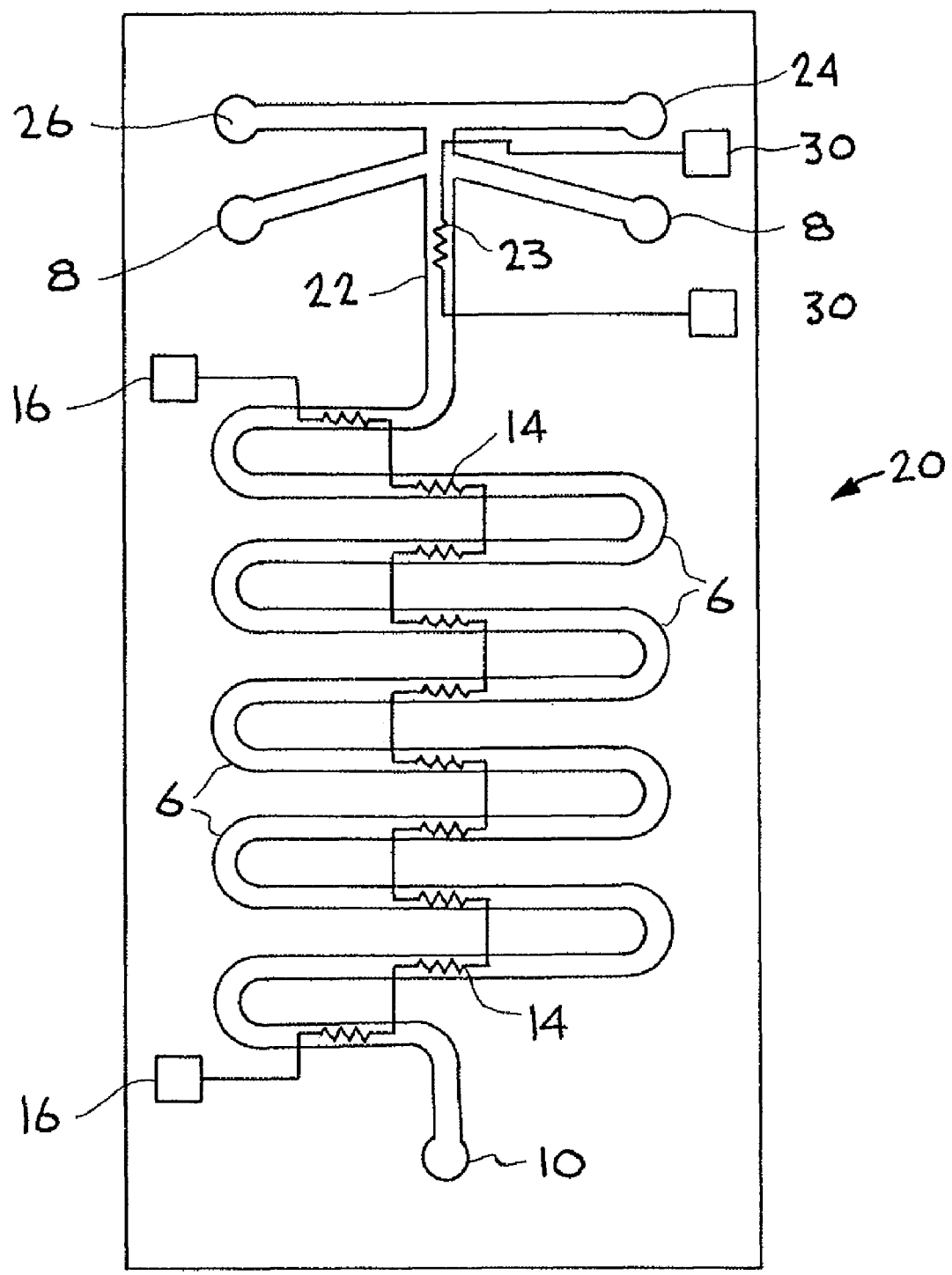
FIG. 5 shows a cross-sectional view of an embodiment of a microreactor integrated with a microcumbuster.

Referring to FIG. 5, these self-sustaining exothermic combustion reactions can be accomplished by forming a microcombustor 20. Microcombuster 20 comprises a small microchannel 22 with a catalyst wire or electrode 23 (typically is a catalyst bed heater), which is separate from the capillary microchannel 6 and porous membrane 12, and at least one electrical contact pad 30 connected to a power source (not shown). This microcombustor has a first inlet 24 for a fuel such as butane or methanol, which is heated with a small resistive heater to form a gas, and a second inlet 26 for air or other oxygen-containing gaseous mixture. The fuel and air are mixed and flow over the catalyst wire or electrode, which is heated by running a current through it similar to a resistor. The fuel/air mixture then ignites a combustion reaction which generates heat, carbon dioxide and water. The heat is transferred to the capillary microchannel and porous membrane and the carbon dioxide and water flow to an outlet (not shown). Once ignited, the reaction is sustained as long as fuel and air flow through inlets 24 and 26 without further current flowing through the catalyst wire 23 or filament. The heat generated from the combustion reaction can be efficiently transferred to the chemical microreactor and, if present, an integrated fuel cell, using the counterflow heat exchange process described above. The outlet gas stream from the microchannel combustor will be hot, and this heat can be readily transferred through high surface area microchannels to adjacent cold gases flowing in opposite directions. The microchannel combustor can be formed using the same approaches described above for the chemical microreactor. In certain fuel cell embodiments, heat may be coupled between the steam reforming packed catalyst microchannel and porous membrane and the fuel cell, thereby reducing the power requirement to heat the fuel cell and make a very efficient power source. The membrane material and porosity, catalyst deposition, and integrated heater layout can be optimized to match a specific fuel, such as methanol, or specific groups of fuels, such as ammonia, methanol and butane.

Several microreactors can be integrated to allow processing of a variety of liquid fuel components. Integrated microreactors which incorporate both fuel cells and fuel reforming may be fabricated in parallel in order to make them suitable for higher power applications ranging from about 10 Watts to about 50 Watts.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

The invention claimed is:

1. A method for forming a chemical microreactor comprising:
    forming at least one capillary microchannel in a substrate having at least one inlet and at least one outlet,
    inserting catalyst particles into the at least one capillary microchannel for filling at least a portion of the at least one capillary microchannel with the catalyst particles,
    integrating at least one heater with the chemical microreactor, interfacing the capillary microchannel with a porous membrane at the outlet of the capillary microchannel.

2. The method of claim 1, additionally including forming the porous membrane using at least one technique selected from the group consisting of thin film deposition, thick film formation, electrochemical etching, plasma etching and selective chemical etching.

3. The method of claim 1, additionally including imbedding the catalyst particles in the porous membrane by a thin film deposition technique.

4. The method of claim 1, additionally including imbedding the catalyst particles by ion exchange.

5. The method of claim 1, additionally including imbedding the catalyst particles by solgel doping.

6. The method of claim 1, wherein the porous membrane has at least one catalyst material imbedded therein.

7. A method for forming a chemical microreactor comprising:
   forming at least one capillary microchannel in a substrate having at least one inlet and at least one outlet,
   integrating at least one heater with the chemical microreactor,
   coupling at least one of a stationary, fixed, porous membrane and a stationary, fixed, porous membrane support structure having a plurality of porous membranes to the outlet of the at least one capillary microchannel;
   the porous membrane or membranes being positioned beyond the outlet of the capillary microchannel, wherein the porous membrane or membranes has at least one catalyst material imbedded therein.

8. The method of claim 7, additionally including forming the porous membrane using at least one of the techniques selected from the group consisting of thin film deposition, thick film formation, electrochemical etching, plasma etching and selective chemical etching.

9. The method of claim 7, additionally including imbedding the catalyst material in the porous membrane by a thin film deposition technique.

10. The method of claim 7, additionally including imbedding the catalyst material by ion exchange.

11. The method of claim 7, additionally including imbedding the catalyst material by solgel doping.

12. The method of claim 7, wherein the substrate comprises silicon.

13. The method of claim 7, further comprising inserting catalyst particles into the at least one capillary microchannel for filling at least a portion of the at least one capillary microchannel with the catalyst particles.

* * * * *